United States Patent
Douglas

(10) Patent No.: US 7,650,252 B2
(45) Date of Patent: Jan. 19, 2010

(54) INCLINOMETER MEASUREMENT SYSTEM AND METHOD PROVIDING CORRECTION FOR MOVEMENT INDUCED ACCELERATION ERRORS

(75) Inventor: Frank Beard Douglas, Tipp City, OH (US)

(73) Assignee: Caterpillar Trimble Control Technologies, LLC, Dayton, OH (US)

( * ) Notice: Subject to any disclaimer, the term of this patent is extended or adjusted under 35 U.S.C. 154(b) by 42 days.

(21) Appl. No.: 12/140,451

(22) Filed: Jun. 17, 2008

(65) Prior Publication Data

US 2009/0312974 A1    Dec. 17, 2009

(51) Int. Cl.
G01C 17/38    (2006.01)
G01C 9/08    (2006.01)

(52) U.S. Cl. .......................... 702/95; 702/154

(58) Field of Classification Search ................ 702/154, 702/94, 95, 141, 145, 150, 151; 73/1.38, 73/1.75, 1.79, 1.84
See application file for complete search history.

(56) References Cited

U.S. PATENT DOCUMENTS

| | | | | |
|---|---|---|---|---|
| 4,038,876 A | * | 8/1977 | Morris | 73/1.38 |
| 5,265,472 A | * | 11/1993 | Pfeifle et al. | 73/514.02 |
| 6,253,160 B1 | | 6/2001 | Hanseder | |
| 6,600,985 B2 | * | 7/2003 | Weaver et al. | 701/45 |
| 6,691,437 B1 | | 2/2004 | Yost et al. | |
| 6,853,947 B1 | * | 2/2005 | Horton | 702/151 |
| 6,873,931 B1 | * | 3/2005 | Nower et al. | 702/151 |
| 6,880,258 B2 | * | 4/2005 | Adams et al. | 33/371 |

* cited by examiner

*Primary Examiner*—Michael P. Nghiem
*Assistant Examiner*—Cindy H Khuu
(74) *Attorney, Agent, or Firm*—Dinsmore & Shohl, LLP

(57) ABSTRACT

A system and a method sense the inclination of a machine element, such as a platform, and eliminate tangential and radial acceleration errors. The platform defines orthogonal X and Y axes, and is rotatable about a Z axis. An inclinometer, mounted on the platform at a location spaced from the axis of rotation by a distance r, provides inclinometer outputs indicating acceleration in the X and Y directions, $I_x$ and $I_y$, respectively. A rate gyro on the platform senses the rotational speed w of the platform. The rate gyro output w is differentiated and multiplied by r to determined tangential acceleration at the inclinometer. A circuit resolves the tangential acceleration into X axis and Y axis components, which are used to correct the inclinometer outputs $I_x$ and $I_y$ for errors that would otherwise result from tangential acceleration.

16 Claims, 3 Drawing Sheets

INCLINOMETER MEASUREMENT SYSTEM AND METHOD PROVIDING CORRECTION FOR MOVEMENT INDUCED ACCELERATION ERRORS

CROSS-REFERENCE TO RELATED APPLICATION

Not applicable.

STATEMENT REGARDING FEDERALLY SPONSORED RESEARCH OR DEVELOPMENT

Not applicable.

BACKGROUND OF THE INVENTION

The present invention relates to an arrangement for correcting measurement errors produced by movement induced acceleration in a gravity referenced inclination sensor, or inclinometer. It is often desired to know the angle of inclination of a movable member of a machine with respect to the gravity of the earth or with respect to other machine elements. One method to accomplish this is to attach gravity referenced inclinometers to the movable member or elements. The present invention provides a means of improving the performance of such inclinometers during those times when the movable member rotates. The present invention corrects for the effects of tangential and rotational acceleration on inclinometer measurements made with inclinometers that sense acceleration due to gravity.

It is particularly useful to be able to monitor the orientation of various construction equipment elements. Such movable elements may, for example, be the boom, the dipper stick, the bucket or the chassis platform of an excavating machine, or the blade or chassis platform of a bulldozer, grader, or scraper. In many instances, the movable member pivots or rotates about a known point or axis as its inclination angle is changed under operator control, or under the control of an automated control system. Gravity referenced inclinometers are particularly suitable for use in construction equipment applications for a number of reasons, such as for example their ruggedness, reliability, small size, ease of installation, and low cost. The useful and desired output signal from such a gravity referenced inclinometer is a measurement of its inclination angle with respect to level. Level is measured with respect to the gravity of the earth. To measure incline angle with respect to gravity, the sensor responds to the vector component of gravitational acceleration that lies along a sensitive axis or axes. This type of sensor is inherently sensitive to acceleration produced by machine movement, since it cannot distinguish between gravitational acceleration and non-gravitational sources of acceleration. Linear, or translational, motions and vibrations also produce measurable accelerations. These non-gravitational sources of acceleration can result in undesired and erroneous output signals from an inclinometer. The magnitude of such erroneous signals is proportional to the non-gravitational acceleration experienced by the inclinometer. In some cases, the undesired signals can be large in comparison to the desired inclination measurement, rendering the sensor output unreliable and unusable until after cessation of the movements that caused this undesired acceleration.

When a movable member is pivoted about an axis, acceleration measurement errors in a radial direction will result from the rotation of the member. When the speed of this rotation changes, acceleration measurement errors will also result in a direction that is tangential to the direction of movement. This tangential acceleration is defined as the linear, or translational acceleration of a point on a rotating object at a distance "r" from the axis of rotation. Tangential acceleration at any location on the movable member is the product of the angular acceleration and the radial distance "r" from the pivot point or axis about which the movable member pivots or rotates. A gravity referenced inclinometer attached to a movable member of a machine might ideally be located at the axis about which that member pivots, or rotates. There, the distance "r" would equal zero, and there would be no tangential acceleration acting on the inclinometer from angular movement of the moving member. There are practical circumstances in which it is not possible or desirable to locate the inclinometer at the axis about which the member rotates.

Systems for displaying or controlling the position of movable elements on construction machines presently exist in a number of forms. Among the available sensors, gravity referenced inclinometers are useful in construction equipment applications for a number of reasons, including ruggedness, reliability, small size, ease of installation, and low cost. When such a gravity referenced inclinometer is not located precisely at the axis about which a movable element on which it is mounted pivots or rotates, it is difficult to obtain an accurate inclination reading. It has been common to filter the output of such an inclinometer to obtain a more stable signal with less jitter superimposed on it. However, low-pass filtering also introduces latency to the measurement of angle. As a result, the machine, or its elements, must be held stationary for a short time in order to obtain accurate position information. Additionally, latency is undesirable in a control system, potentially contributing to system instability.

It is seen, therefore, that there is a need for an arrangement to correct for measurement error induced in a gravity referenced inclinometer by acceleration when the inclinometer is mounted on a machine element that pivots or rotates, and for such an arrangement in which the speed and accuracy of the inclinometer are enhanced.

SUMMARY OF THE INVENTION

These needs are met by a system and method according to the present invention for sensing the inclination of a platform with respect to gravity. The word "platform" is intended to include any machine element on which an inclinometer is mounted, and is not to be limited to a machine element that supports other machine elements. The platform defines orthogonal X and Y axes, and a Z axis orthogonal to both the X and Y axes. The platform is rotatable about an axis of rotation extending parallel to the Z axis. The system includes an inclinometer, mounted on the platform at a location spaced from the axis of rotation by a distance r, for providing inclinometer outputs indicating acceleration in the X and Y directions, designated as $I_x$ and $I_y$, respectively. A line from the axis of rotation to the inclinometer forms an included angle B with the X axis. A rate gyro is mounted on the platform. The rate gyro senses the rotational speed w of the platform about the axis of rotation and provides a rate gyro output indicating the rotational speed w. A circuit differentiates the rate gyro output to determine the angular acceleration of the platform dw/dt. A circuit multiplies the angular acceleration by the value r to determine the tangential acceleration of the platform at the point where the inclinometer is mounted r(dw/dt). A circuit resolves the tangential acceleration of the platform at the point where the inclinometer is mounted to determine the X axis component thereof, and resolves the tangential acceleration of the platform at the point where the inclinometer is mounted to determine the Y axis component thereof. A circuit subtracts the X axis component of the tangential acceleration of the platform at the point where the inclinometer is mounted from the acceleration $I_x$, sensed in a direction parallel to the X axis, and subtracts the Y axis component of the tangential acceleration of the platform at the point where the inclinometer is mounted from the acceleration $I_y$, sensed in a direction parallel to the Y axis. As a consequence, the inclinometer outputs $I_x$ and $I_y$ are corrected for errors that would otherwise result from tangential acceleration.

The system may further include a circuit for squaring the rotational speed w of the platform about the axis of rotation, and multiplying the squared rotational speed by the distance r to determine the radial acceleration of the platform. A circuit resolves the radial acceleration of the platform at the point where the inclinometer is mounted to determine the X axis component thereof, and resolves the radial acceleration of the platform at the point where the inclinometer is mounted to determine the Y axis component thereof. A circuit subtracts the X axis component of the radial acceleration of the platform at the point where the inclinometer is mounted from the acceleration $I_X$ sensed in a direction parallel to the X axis, and subtracts the Y axis component of the radial acceleration of the platform at the point where the inclinometer is mounted from the acceleration $I_Y$ sensed in a direction parallel to the Y axis. As a consequence, the inclinometer outputs $I_x$ and $I_y$ are corrected for errors that would otherwise result from radial acceleration.

The circuit for resolving the radial acceleration of the platform at the point where the inclinometer is mounted to determine the X axis component thereof, and for resolving the radial acceleration of the platform at the point where the inclinometer is mounted to determine the Y axis component thereof, multiplies the radial acceleration of the platform at the point where the inclinometer is mounted by cos(B) and sin(B) to determine the X axis and Y axis components, respectively. The circuit for resolving the tangential acceleration of the platform at the point where the inclinometer is mounted to determine the X axis component thereof, and for resolving the tangential acceleration of the platform at the point where the inclinometer is mounted to determine the Y axis component thereof, multiplies the tangential acceleration of the platform at the point where the inclinometer is mounted by sin(B) and cos(B) to determine the X axis and Y axis components, respectively.

A method is provided for sensing the inclination of a platform with respect to gravity, the platform defining orthogonal X and Y axes, and a Z axis orthogonal to both the X and Y axes, the platform being rotatable about an axis of rotation extending parallel to the Z axis. The method includes the steps of a.) sensing acceleration in the X and Y directions, designated as $I_x$ and $I_y$, respectively, from an inclinometer mounted on the platform at a location spaced from the axis of rotation by a distance r, and providing such inclinometer outputs; b.) sensing the rotational speed w of the platform about the axis of rotation and providing an output indicating the rotational speed w; c.) differentiating the rotational speed w to determine the angular acceleration of the platform dw/dt; d.) multiplying the angular acceleration by the value r to determine the tangential acceleration of the platform at the point where the inclinometer is mounted r(dw/dt); e.) resolving the tangential acceleration of the platform at the point where the inclinometer is mounted to determine the X axis component thereof; f.) resolving the tangential acceleration of the platform at the point where the inclinometer is mounted to determine the Y axis component thereof; g.) subtracting the X axis component of the tangential acceleration of the platform at the point where the inclinometer is mounted from the acceleration $I_x$ sensed in a direction parallel to the X axis; and h.) subtracting the Y axis component of the tangential acceleration of the platform at the point where the inclinometer is mounted from the acceleration $I_Y$ sensed in a direction parallel to the Y axis, whereby the inclinometer outputs $I_x$ and $I_y$ are corrected for errors that would otherwise result from tangential acceleration.

The method may further include the steps of i.) squaring the rotational speed w of the platform about the axis of rotation, and multiplying the squared rotational speed by the distance r to provide the radial acceleration of the platform; j.) resolving the radial acceleration of the platform at the point where the inclinometer is mounted to determine the X axis component thereof; k.) resolving the radial acceleration of the platform at the point where the inclinometer is mounted to determine the Y axis component thereof; l.) subtracting the X axis component of the radial acceleration of the platform at the point where the inclinometer is mounted from the acceleration $I_X$ sensed in a direction parallel to the X axis; and m.) subtracting the Y axis component of the radial acceleration of the platform at the point where the inclinometer is mounted from the acceleration $I_Y$ sensed in a direction parallel to the Y axis, whereby the inclinometer outputs $I_x$ and $I_y$ are corrected for errors that would otherwise result from radial acceleration.

The steps of resolving the radial acceleration of the platform at the point where the inclinometer is mounted to determine the X axis component thereof, and resolving the radial acceleration of the platform at the point where the inclinometer is mounted to determine the Y axis component thereof, may include the step of multiplying the radial acceleration of the platform at the point where the inclinometer is mounted by cos(B) and sin(B) to determine the X axis and Y axis components, respectively. The angle B is an included angle between a line from the axis of rotation to the inclinometer and the X axis.

The steps of resolving the tangential acceleration of the platform at the point where the inclinometer is mounted to determine the X axis component thereof, and resolving the tangential acceleration of the platform at the point where the inclinometer is mounted to determine the Y axis component thereof, include the step of multiplying the tangential acceleration of the platform at the point where the inclinometer is mounted by sin(B) and cos(B) to determine the X axis and Y axis components thereof, respectively. The angle B is an included angle between a line from the axis of rotation to the inclinometer and the X axis.

Accordingly, it is an object of the present invention to provide an arrangement and method by which compensation may be provided for radial and tangential acceleration in a system in which orientation of a moving element is determined by an inclinometer with respect to gravity.

DETAILED DESCRIPTION OF THE PREFERRED EMBODIMENT

Figure 1:
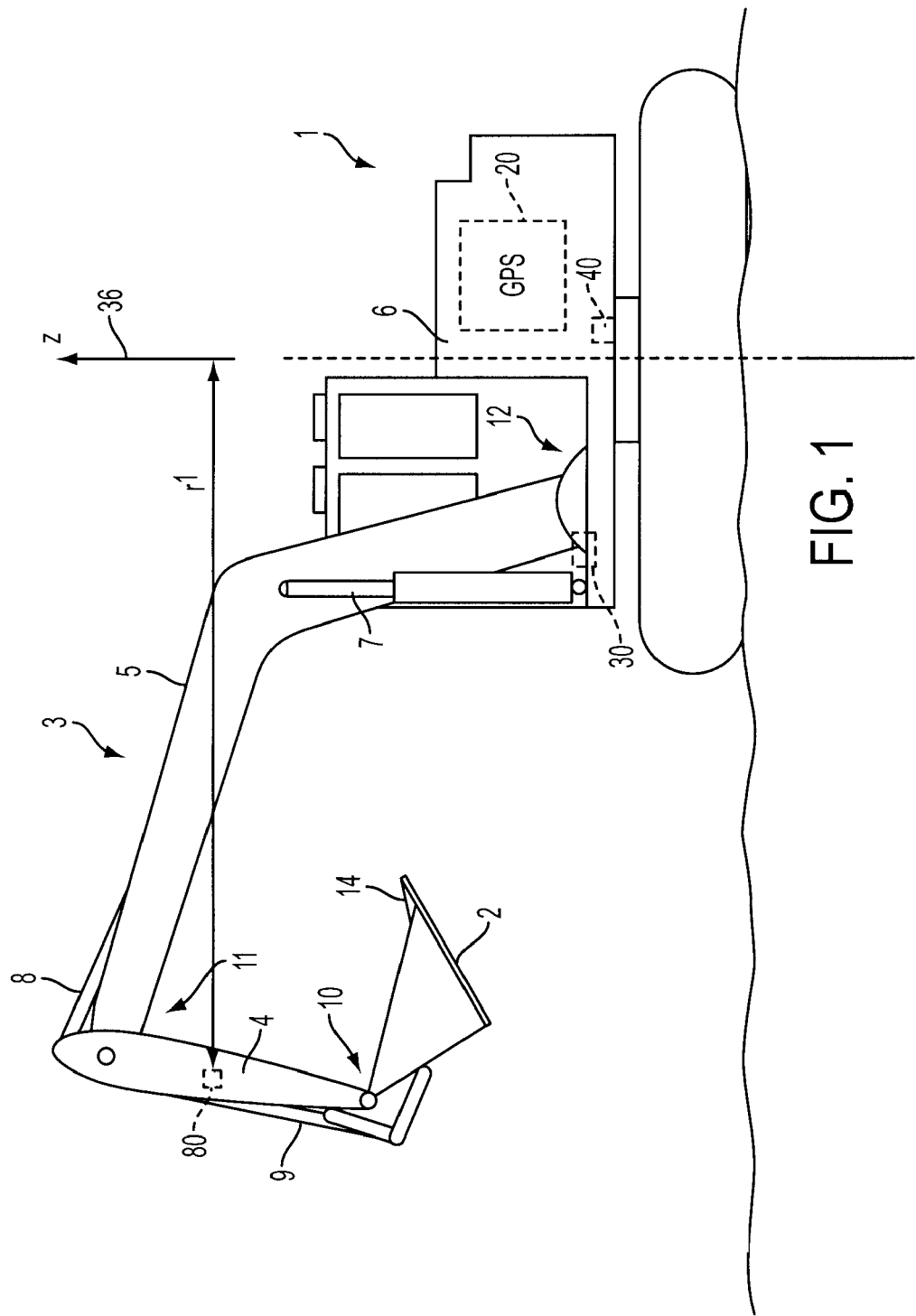
FIG. 1 shows a machine, illustrated as an excavator, upon which the system and method of the present invention may be used to improve the inclination measurement of a machine element.

Reference is made to FIG. 1, which shows an excavator 1 having a positionable tool, such as for example a bucket 2, attached to a tool positioning mechanism 3. The tool positioning mechanism 3 includes a dipper stick 4, and a boom 5 coupled to the cab 6 of the excavator 1. The cab 6 acts as the platform from which the boom 5, dipper stick 4, and bucket 2 may be moved by a series of hydraulic cylinders 7 under operator control, or under control of an on board excavator control system.

The tool positioning mechanism 3 may include a number of linear or angular position encoders or other similar sensors (not shown), the outputs of which may indicate the orientation and location of the tool positioning mechanism 3 with respect to the cab 6. The encoders may be positioned at various locations along the boom 5, the dipper stick 4, and the bucket 2. The encoders may indicate, for example, the linear positions of linkages and hydraulic cylinders, or the relative angles of pivot points 10, 11, and 12. It will be appreciated, however, that all of these measurements are relative to the platform or cab 6, and so the inclination of the cab or platform with respect to gravity is needed to assess the orientation of the tool positioning mechanism.

The information output by the various encoders may be used by the on-board tool control system for automatically positioning the bucket 2 or for guiding an operator in manually positioning the bucket 2. For example, the on-board processing system may have access to a digital terrain model, specifying design elevations for various locations on the job site. The on-board processing may further include a precise positioning system, such as a GPS receiver system 20. The on board processing system may use data from the digital terrain model and position data from the GPS receiver 20 to position the bucket 2 or to provide guidance to the operator in manually positioning the bucket 2.

Figure 2:
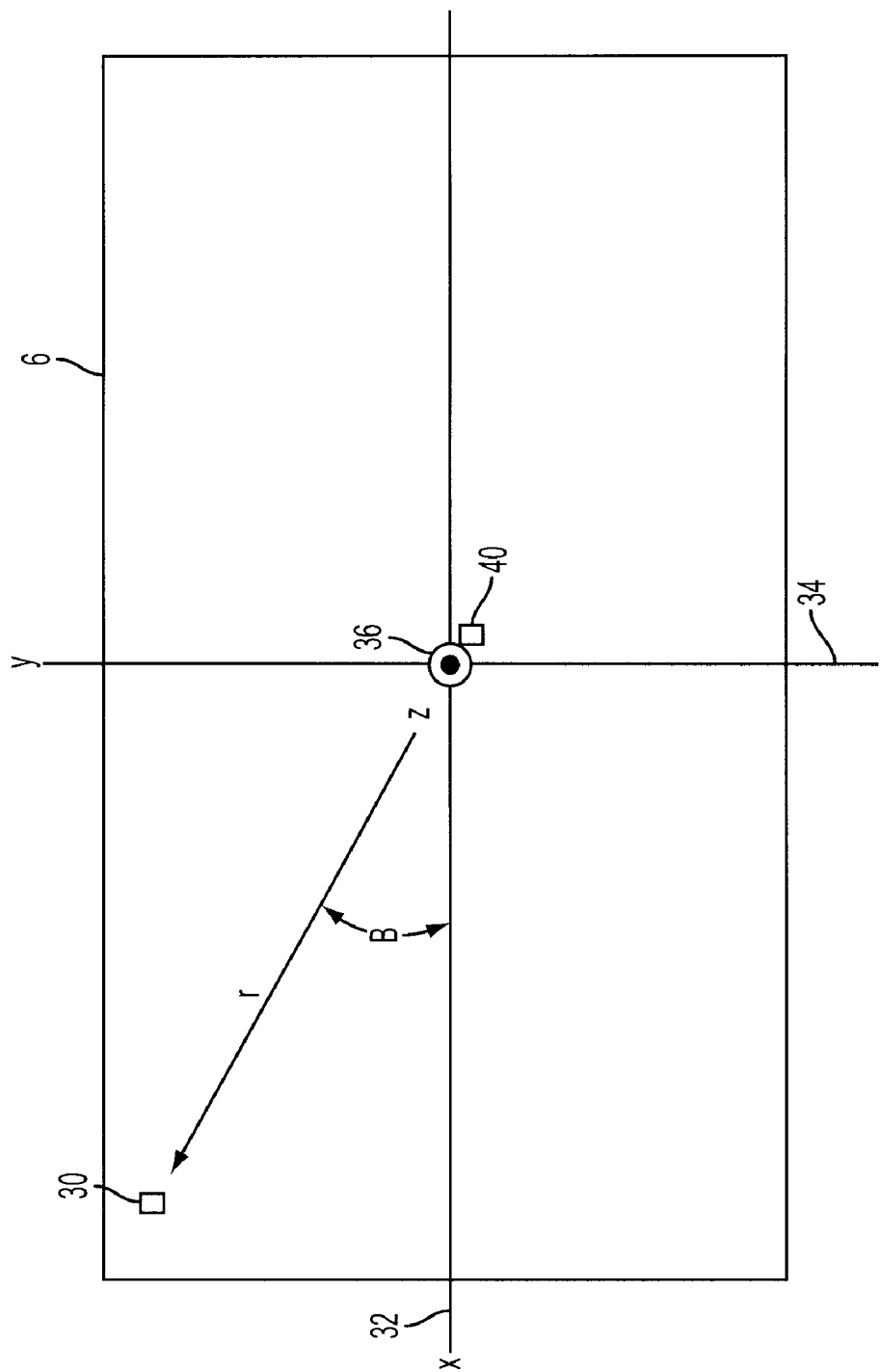
FIG. 2. is a diagrammatic representation of the excavator of FIG. 1, as seen from above, showing the axis of rotation of the machine platform and the position of a platform inclinometer.

It will be appreciated that it is important to determine the inclination of the platform 6 as a part of this process, and an inclinometer 30 is positioned on the platform 6, as shown in FIGS. 1 and 2. As will be appreciated, inclinometer 30 is a dual axis inclinometer which provides an indication of inclination along an X axis 32 and a Y axis 34. Typically, such a device senses the acceleration due to gravity, and the degree to which there is an acceleration in the X or Y directions indicates the degree to which the platform 6 is tilted from a precisely horizontal orientation. The excavator 1 may be pivoted around a vertical Z axis 36 as the machine is operated. It will be appreciated that this rotation results in radial and tangential acceleration forces being applied to the inclinometer 30 which will result in a transient error. While it is possible to pause the operation of the excavator periodically to allow the transient errors to subside so that an accurate reading of the orientation of the platform can be obtained, this method of operation is inefficient. The present invention contemplates a system in which the tangential and radial acceleration levels are determined by means of a rate gyroscope, and the tangential and radial acceleration levels are subtracted from the measured acceleration levels to provide a compensated indication of inclination.

Figure 3:
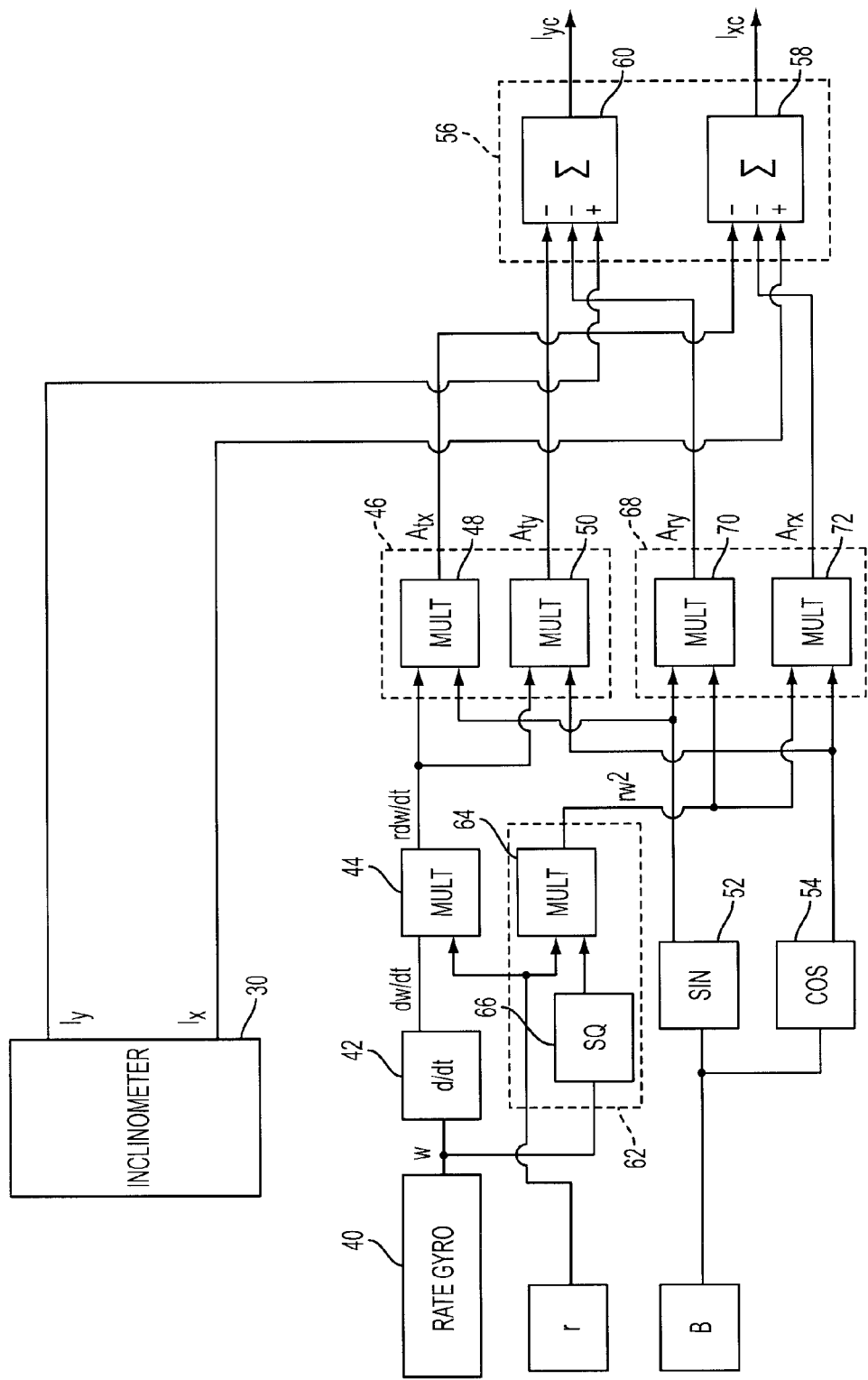
FIG. 3 is a schematic representation of the system according to the present invention for sensing inclination in an enhanced manner according to the present invention.

The inclinometer 30 is mounted on the platform 6 at a location spaced from the axis of rotation 36 by a distance r, and provides inclinometer outputs indicating acceleration in the X and Y directions, designated as $I_x$ and $I_y$, respectively, in FIG. 3. A line from the axis of rotation 36 to the inclinometer 30 forms an included angle B with the X axis 32. A rate gyro 40 is mounted on the platform 6 and senses the rotational speed w of the platform 6 about the axis of rotation 36. The rate gyro 40 provides a rate gyro output indicating the rotational speed w. FIG. 3 indicates the manner in which the rate gyro output w is used in conjunction with angle B and distance r, both determined at the time that the system is installed and remaining constant in this arrangement, to determine tangential and radial acceleration so that the outputs from the inclinometer 30 can be corrected.

A circuit 42 differentiates the rate gyro output w to determine the angular acceleration of the platform 6 as dw/dt. Circuit 44 multiplies the angular acceleration dw/dt by the value r to determine the tangential acceleration of the platform at the point where the inclinometer is mounted, as r(dw/dt). Circuit 46 resolves the tangential acceleration r(dw/dt) of the platform 6 at the point where the inclinometer 30 is mounted to determine the X axis component $A_{tx}$, thereof, and resolves the tangential acceleration of the platform 6 at the point where the inclinometer 30 is mounted to determine the Y axis component $A_{ty}$, thereof. To resolve the tangential acceleration into its X axis and Y axis components, the acceleration is multiplied at 48 and 50 by the sine and cosine of B, provided by circuits 52 and 54, respectively.

A circuit 56 is provided for subtracting the X axis component of the tangential acceleration of the platform at the point where the inclinometer is mounted, $A_{tx}$, from the acceleration $I_X$ sensed in a direction parallel to the X axis, and for subtracting the Y axis component of the tangential acceleration of the platform at the point where the inclinometer is mounted, $A_{tx}$, from the acceleration $I_Y$ sensed in a direction parallel to the Y axis. As a result, the inclinometer outputs $I_x$ and $I_y$ are corrected for errors that would otherwise result from tangential acceleration, and are provided as outputs $I_{xc}$ and $I_{yc}$, respectively. The circuit 56 includes circuits 58 and 60 for performing the needed subtraction.

The present invention may also correct for errors due to radial acceleration of the inclinometer when the platform 6 is rotated about Z axis 36. Toward this end, the system includes a circuit 62 which squares the output w from the rate gyro 40 (the rotational speed w of the platform 6 about the axis of rotation 36), and multiplies the squared rotational speed $w^2$ by the distance r to determine the radial acceleration $rw^2$ of the platform 6. Circuit 62 includes multiplier 64 and squaring circuit 66. A circuit 68 is provided for resolving the radial acceleration $A_r$ of the platform 6 at the point where the inclinometer 30 is mounted to determine the X axis component, $A_{rx}$, thereof, and for resolving the radial acceleration $A_r$ of the platform 6 at the point where the inclinometer 30 is mounted to determine the Y axis component, $A_{ry}$, thereof. To resolve the radial acceleration into its X axis and Y axis components, the acceleration is multiplied at 70 and 72 by the sine and cosine of B, provided by circuits 52 and 54, respectively. Finally, circuit 56 subtracts the X axis component of the radial acceleration of the platform 6 at the point where the inclinometer 30 is mounted from the acceleration $I_X$ sensed in a direction parallel to the X axis, and subtracts the Y axis component of the radial acceleration of the platform 6 at the point where the inclinometer 30 is mounted from the acceleration $I_Y$ sensed in a direction parallel to the Y axis. By this arrangement, the inclinometer outputs $I_x$ and $I_y$ are corrected for errors that would otherwise result from radial acceleration.

It will be appreciated that while the invention is illustrated in the specification and claims as implemented by a series of discrete circuits performing the required functions, the invention and claims encompass constructions in which these circuits constitute a computer-based implementation by use of a microprocessor or otherwise. The illustrated circuits provide an explanation of the manner in which data is processed, but a computer system in which these functions are accomplished by means of software or firmware is contemplated as within the scope of the invention.

It will be apparent that the present invention is not limited to correcting inclination measurements for a platform, but in fact may be used to correct gravity based measurements for tangential acceleration and radial acceleration in any setting. For example, if a gravity based inclinometer 80 (shown in dashed lines in FIG. 1) were to be mounted on a machine element such as the dipper stick 4 of the excavator 1, rotation of the platform 6 about axis 36 would produce errors in the measurements provided from the inclinometer 80 as a result of tangential and radial acceleration. These errors can be removed from the inclinometer outputs in generally the same way as described above. It would be necessary, however, in this arrangement to take into account the fact that distance r' is not a constant, but varies during operation of the excavator. It is believed that systems that operate in this fashion come within the scope of the present invention and the appended claims.

Other aspects, objects, and advantages of the present invention can be obtained from a study of the drawings, the disclosure, and the appended claims.

What is claimed is:

1. A system for sensing the inclination of element with respect to gravity, said element defining orthogonal X and Y axes, and a Z axis orthogonal to both said X and Y axes, said element being rotatable about an axis of rotation extending parallel to said Z axis, said element being supported by and rotatable with a platform, comprising:

an inclinometer, mounted on said element at a location spaced from said axis of rotation by a distance r, for providing inclinometer outputs indicating acceleration in the X and Y directions, designated as $I_x$ and $I_y$, respectively, a line from said axis of rotation to said inclinometer forming an included angle B with said X axis, a sensor, mounted on said platform, for sensing the rotational speed w of the element about said axis of rotation and providing a sensor output indicating said rotational speed W, a circuit for differentiating said sensor output to determine the angular acceleration of said element dw/dt, a circuit for multiplying said angular acceleration by the value r to determine the tangential acceleration of said element at said point where said inclinometer is mounted r(dw/dt), a circuit for resolving the tangential acceleration of said element at said point where said inclinometer is mounted to determine the X axis component thereof, and for resolving the tangential acceleration of said platform at said point where said inclinometer is mounted to determine the Y axis component thereof, and a circuit for subtracting said X axis component of said tangential acceleration of said element at said point where said inclinometer is mounted from said acceleration $I_x$ sensed in a direction parallel to said X axis, and for subtracting said Y axis component of said tangential acceleration of said element at said point where said inclinometer is mounted from said acceleration $I_y$ sensed in a direction parallel to said Y axis, whereby said inclinometer outputs $I_x$ and $I_y$ are corrected for errors that would otherwise result from tangential acceleration.

2. The system of claim 1, further comprising:

a circuit for squaring the rotational speed w of the element about said axis of rotation, and multiplying the squared rotational speed by the distance r to determine the radial acceleration of the element, a circuit for resolving the radial acceleration of said element at said point where said inclinometer is mounted to determine the X axis component thereof, and for resolving the radial acceleration of said element at said point where said inclinometer is mounted to determine the Y axis component thereof, and a circuit for subtracting said X axis component of said radial acceleration of said element at said point where said inclinometer is mounted from said acceleration $I_x$ sensed in a direction parallel to said X axis, and for subtracting said Y axis component of said radial acceleration of said element at said point where said inclinometer is mounted from said acceleration $I_y$ sensed in a direction parallel to said Y axis, whereby said inclinometer outputs $I_x$ and $I_y$ are corrected for errors that would otherwise result from radial acceleration.

3. The system of claim 2 in which said circuit for resolving the radial acceleration of said element at said point where said inclinometer is mounted to determine the X axis component thereof, and for resolving the radial acceleration of said element at said point where said inclinometer is mounted to determine the Y axis component thereof, multiplies said radial acceleration of said element at said point where said inclinometer is mounted by cos(B) and sin(B) to determine said X axis and Y axis components, respectively.

4. The system of claim 1 in which said circuit for resolving the tangential acceleration of said element at said point where said inclinometer is mounted to determine the X axis component thereof, and for resolving the tangential acceleration of said element at said point where said inclinometer is mounted to determine the Y axis component thereof, multiplies said tangential acceleration of said element at said point where said inclinometer is mounted by sin(B) and cos(B) to determine said X axis and Y axis components, respectively.

5. A method for sensing the inclination of an element with respect to gravity, said element defining orthogonal X and Y axes, and a Z axis orthogonal to both said X and Y axes, said element being rotatable about an axis of rotation extending parallel to said Z axis, comprising the steps of:

sensing acceleration in the X and Y directions, designated as $I_x$ and $I_y$, respectively, from an inclinometer mounted on said element at a location spaced from said axis of rotation by a distance r, and providing inclinometer outputs indicating acceleration in the X and Y directions, sensing the rotational speed w of the element about said axis of rotation and providing an output indicating said rotational speed w, differentiating said rotational speed w to determine the angular acceleration of said element dw/dt, multiplying said angular acceleration by the value r to determine the tangential acceleration of said element at said point where said inclinometer is mounted r(dw/dt), resolving the tangential acceleration of said element at said point where said inclinometer is mounted to determine the X axis component thereof, resolving the tangential acceleration of said element at said point where said inclinometer is mounted to determine the Y axis component thereof, subtracting said X axis component of said tangential acceleration of said element at said point where said inclinometer is mounted from said acceleration $I_x$ sensed in a direction parallel to said X axis, and subtracting said Y axis component of said tangential acceleration of said element at said point where said inclinometer is mounted from said acceleration $I_y$ sensed in a direction parallel to said Y axis, whereby said inclinometer outputs $I_x$ and $I_y$ are corrected for errors that would otherwise result from tangential acceleration.

6. The method of claim 5, further comprising the steps of:
squaring the rotational speed w of the element about said axis of rotation, and multiplying the squared rotational speed by the distance r to provide the radial acceleration of the element,
resolving the radial acceleration of said element at said point where said inclinometer is mounted to determine the X axis component thereof,
resolving the radial acceleration of said element at said point where said inclinometer is mounted to determine the Y axis component thereof,
subtracting said X axis component of said radial acceleration of said element at said point where said inclinometer is mounted from said acceleration $I_X$ sensed in a direction parallel to said X axis, and
subtracting said Y axis component of said radial acceleration of said element at said point where said inclinometer is mounted from said acceleration $I_Y$ sensed in a direction parallel to said Y axis, whereby said inclinometer outputs $I_x$ and $I_y$ are corrected for errors that would otherwise result from radial acceleration.

7. The method of claim 6 in which said steps of resolving the radial acceleration of said element at said point where said inclinometer is mounted to determine the X axis component thereof, and resolving the radial acceleration of said element at said point where said inclinometer is mounted to determine the Y axis component thereof, include the step of multiplying said radial acceleration of said element at said point where said inclinometer is mounted by cos(B) and sin(B) to determine said X axis and Y axis components, respectively, said angle B being an included angle between a line from said axis of rotation to said inclinometer and said X axis.

8. The method of claim 5 in which said steps of resolving the tangential acceleration of said element at said point where said inclinometer is mounted to determine the X axis component thereof, and resolving the tangential acceleration of said element at said point where said inclinometer is mounted to determine the Y axis component thereof, includes the step of multiplying said tangential acceleration of said element at said point where said inclinometer is mounted by sin(B) and cos(B) to determine said X axis and Y axis components thereof, respectively, said angle B being an included angle between a line from said axis of rotation to said inclinometer and said X axis.

9. A system for sensing the inclination of a platform with respect to gravity, said platform defining orthogonal X and Y axes, and a Z axis orthogonal to both said X and Y axes, said platform being rotatable about an axis of rotation extending parallel to said Z axis, comprising:
an inclinometer, mounted on said platform at a location spaced from said axis of rotation by a distance r, for providing inclinometer outputs indicating acceleration in the X and Y directions, designated as $I_x$ and $I_y$, respectively, a line from said axis of rotation to said inclinometer forming an included angle B with said X axis,
a rate gyro, mounted on the platform, for sensing the rotational speed w of the platform about said axis of rotation and providing a rate gyro output indicating said rotational speed w,
a circuit for differentiating said rate gyro output to determine the angular acceleration of said platform dw/dt,
a circuit for multiplying said angular acceleration by the value r to determine the tangential acceleration of said platform at said point where said inclinometer is mounted r(dw/dt),
a circuit for resolving the tangential acceleration of said platform at said point where said inclinometer is mounted to determine the X axis component thereof, and for resolving the tangential acceleration of said platform at said point where said inclinometer is mounted to determine the Y axis component thereof, and
a circuit for subtracting said X axis component of said tangential acceleration of said platform at said point where said inclinometer is mounted from said acceleration $I_X$ sensed in a direction parallel to said X axis, and for subtracting said Y axis component of said tangential acceleration of said platform at said point where said inclinometer is mounted from said acceleration $I_Y$ sensed in a direction parallel to said Y axis, whereby said inclinometer outputs $I_x$ and $I_y$ are corrected for errors that would otherwise result from tangential acceleration.

10. The system of claim 9, further comprising:
a circuit for squaring the rotational speed w of the platform about said axis of rotation, and multiplying the squared rotational speed by the distance r to determine the radial acceleration of the platform,
a circuit for resolving the radial acceleration of said platform at said point where said inclinometer is mounted to determine the X axis component thereof, and for resolving the radial acceleration of said platform at said point where said inclinometer is mounted to determine the Y axis component thereof, and
a circuit for subtracting said X axis component of said radial acceleration of said platform at said point where said inclinometer is mounted from said acceleration $I_X$ sensed in a direction parallel to said X axis, and for subtracting said Y axis component of said radial acceleration of said platform at said point where said inclinometer is mounted from said acceleration $I_Y$ sensed in a direction parallel to said Y axis, whereby said inclinometer outputs $I_x$ and $I_y$ are corrected for errors that would otherwise result from radial acceleration.

11. The system of claim 10 in which said circuit for resolving the radial acceleration of said platform at said point where said inclinometer is mounted to determine the X axis component thereof, and for resolving the radial acceleration of said platform at said point where said inclinometer is mounted to determine the Y axis component thereof, multiplies said radial acceleration of said platform at said point where said inclinometer is mounted by cos(B) and sin(B) to determine said X axis and Y axis components, respectively.

12. The system of claim 9 in which said circuit for resolving the tangential acceleration of said platform at said point where said inclinometer is mounted to determine the X axis component thereof, and for resolving the tangential acceleration of said platform at said point where said inclinometer is mounted to determine the Y axis component thereof, multiplies said tangential acceleration of said platform at said point where said inclinometer is mounted by sin(B) and cos(B) to determine said X axis and Y axis components, respectively.

13. A method for sensing the inclination of a platform with respect to gravity, said platform defining orthogonal X and Y axes, and a Z axis orthogonal to both said X and Y axes, said platform being rotatable about an axis of rotation extending parallel to said Z axis, comprising the steps of:
sensing acceleration in the X and Y directions, designated as $I_x$ and $I_y$, respectively, from an inclinometer mounted on said platform at a location spaced from said axis of rotation by a distance r, and providing inclinometer outputs indicating acceleration in the X and Y directions, sensing the rotational speed w of the platform about said axis of rotation and providing an output indicating said rotational speed w, differentiating said rotational speed w to determine the angular acceleration of said platform dw/dt, multiplying said angular acceleration by the value r to determine the tangential acceleration of said platform at said point where said inclinometer is mounted r(dw/dt), resolving the tangential acceleration of said platform at said point where said inclinometer is mounted to determine the X axis component thereof, resolving the tangential acceleration of said platform at said point where said inclinometer is mounted to determine the Y axis component thereof, subtracting said X axis component of said tangential acceleration of said platform at said point where said inclinometer is mounted from said acceleration $I_X$ sensed in a direction parallel to said X axis, and subtracting said Y axis component of said tangential acceleration of said platform at said point where said inclinometer is mounted from said acceleration $I_Y$ sensed in a direction parallel to said Y axis, whereby said inclinometer outputs $I_x$ and $I_y$ are corrected for errors that would otherwise result from tangential acceleration.

14. The method of claim 13, further comprising the steps of:

squaring the rotational speed w of the platform about said axis of rotation, and multiplying the squared rotational speed by the distance r to provide the radial acceleration of the platform, resolving the radial acceleration of said platform at said point where said inclinometer is mounted to determine the X axis component thereof, resolving the radial acceleration of said platform at said point where said inclinometer is mounted to determine the Y axis component thereof, subtracting said X axis component of said radial acceleration of said platform at said point where said inclinometer is mounted from said acceleration $I_X$ sensed in a direction parallel to said X axis, and subtracting said Y axis component of said radial acceleration of said platform at said point where said inclinometer is mounted from said acceleration $I_Y$ sensed in a direction parallel to said Y axis, whereby said inclinometer outputs $I_x$ and $I_y$ are corrected for errors that would otherwise result from radial acceleration.

15. The method of claim 14 in which said steps of resolving the radial acceleration of said platform at said point where said inclinometer is mounted to determine the X axis component thereof, and resolving the radial acceleration of said platform at said point where said inclinometer is mounted to determine the Y axis component thereof, include the step of multiplying said radial acceleration of said platform at said point where said inclinometer is mounted by cos(B) and sin(B) to determine said X axis and Y axis components, respectively, said angle B being an included angle between a line from said axis of rotation to said inclinometer and said X axis.

16. The method of claim 13 in which said steps of resolving the tangential acceleration of said platform at said point where said inclinometer is mounted to determine the X axis component thereof, and resolving the tangential acceleration of said platform at said point where said inclinometer is mounted to determine the Y axis component thereof, includes the step of multiplying said tangential acceleration of said platform at said point where said inclinometer is mounted by sin(B) and cos(B) to determine said X axis and Y axis components thereof, respectively, said angle B being an included angle between a line from said axis of rotation to said inclinometer and said X axis.

* * * * *